(12) United States Patent
Emura (10) Patent No.: US 9,086,138 B1
(45) Date of Patent: Jul. 21, 2015

(54) BICYCLE SPROCKET

(71) Applicant: Shimano Inc., Sakai, Osaka (JP)

(72) Inventor: Atsuhiro Emura, Osaka (JP)

(73) Assignee: Shimano Inc., Osaka (JP)

( * ) Notice: Subject to any disclaimer, the term of this patent is extended or adjusted under 35 U.S.C. 154(b) by 3 days.

(21) Appl. No.: 14/154,653

(22) Filed: Jan. 14, 2014

(51) Int. Cl.
*F16H 55/30* (2006.01)
*F16H 7/06* (2006.01)

(52) U.S. Cl.
CPC . *F16H 55/30* (2013.01); *F16H 7/06* (2013.01)

(58) Field of Classification Search
CPC .......... F16H 55/30; F16H 7/06; B62M 9/105; B62M 9/00; B62D 55/08
USPC .................................. 474/156, 152
See application file for complete search history.

(56) References Cited

U.S. PATENT DOCUMENTS

| | | | | | |
|---|---|---|---|---|---|
| 257,445 | A | * | 5/1882 | Lechner | 474/164 |
| 536,813 | A | * | 4/1895 | MacPhail | 474/152 |
| 586,991 | A | * | 7/1897 | Curley | 474/156 |
| 591,270 | A | * | 10/1897 | Gauthier | 474/156 |
| 1,482,896 | A | * | 2/1924 | Huntington et al. | 474/152 |
| 2,602,343 | A | * | 7/1952 | Barrett et al. | 474/156 |
| 3,969,947 | A | * | 7/1976 | Martin et al. | 474/156 |
| 4,144,773 | A | * | 3/1979 | Addicks | 474/161 |
| 4,174,642 | A | * | 11/1979 | Martin et al. | 474/156 |
| 4,240,303 | A | * | 12/1980 | Mosley | 474/144 |
| 4,261,214 | A | * | 4/1981 | Watanabe et al. | 474/156 |
| 7,686,721 | B2 | * | 3/2010 | Tabe et al. | 474/152 |
| 7,824,287 | B2 | * | 11/2010 | Nonoshita et al. | 474/161 |
| 8,888,631 | B2 | * | 11/2014 | Morita | 474/153 |
| 2006/0258498 | A1 | * | 11/2006 | Tabe et al. | 474/160 |
| 2007/0054768 | A1 | * | 3/2007 | Miyazawa | 474/152 |
| 2013/0109519 | A1 | * | 5/2013 | Morita | 474/148 |
| 2013/0139642 | A1 | * | 6/2013 | Reiter et al. | 74/594.2 |

OTHER PUBLICATIONS

U.S. Appl. No. 14/053,630, filed Oct. 15, 2013, Akinobu Sugimoto et al. (unpublished).

* cited by examiner

*Primary Examiner* — Henry Liu
(74) *Attorney, Agent, or Firm* — Global IP Counselors (57) ABSTRACT

A bicycle sprocket basically includes a sprocket main body, a plurality of teeth and at least one projecting member. The teeth are disposed along a circumferential direction on a radially outer side of the sprocket main body. The teeth include at least one first tooth and at least one second tooth. The at least one projecting member protrudes from an axial surface of the at least one first tooth. The at least one projecting member is a different material from the teeth. The at least one projecting member and the at least one first tooth define a first chain engaging tooth width for engaging with an outer link of a bicycle chain. The at least one second tooth defines a second chain engaging tooth width for engaging with an inner link of the bicycle chain. The first chain engaging tooth width is greater than the second chain engaging tooth width.

18 Claims, 10 Drawing Sheets

BICYCLE SPROCKET

BACKGROUND

1. Field of the Invention

This invention generally relates to a bicycle sprocket that drives a bicycle chain.

2. Background Information

Most bicycles have a drive unit or drive train that uses a chain to transmit the pedaling action from the rider to the rear wheel. A bicycle drive train typically has one or more front sprockets provided on a bicycle crank assembly of the bicycle and one or more rear sprockets provided on a rear hub of the bicycle. The chain wraps around the front and rear sprockets. Thus, rotation of the bicycle crank assembly by the rider is transmitted to the rear wheel by the chain, which meshes with the front and rear sprockets. A bicycle chain has a plurality of inner links and a plurality of outer links that are interconnected in an alternating manner by a plurality of pins. Typically, each of the inner links includes a pair of parallel inner link plates connected by the pins that are surrounded by cylindrical rollers. Each of the outer links includes a pair of parallel outer link plates connected by the pins of the adjacent inner links. In this way, the inner links and the outer links are linked alternately. Therefore, when the teeth of a sprocket all have the same thickness, gaps occur between the outer link plates and the teeth of the sprocket that are larger than the gaps between the inner link, plates and the teeth of the sprocket. In view of this situation, sprockets have been proposed in which the axial widths of the teeth meshing with the outer links are greater than the axial widths of the teeth meshing with the inner links (see, for example U.S. Pat. No. 4,174,642).

SUMMARY

Generally, the present disclosure is directed to various features of a bicycle sprocket that has teeth of different axial widths relative to a rotational center axis direction of the sprocket for preventing the chain from easily separating from the teeth of the sprocket.

In view of the state of the known technology and in accordance with a first aspect of the present disclosure, a bicycle sprocket is provided that basically comprises a sprocket main body, a plurality of teeth and at least one projecting member. The sprocket main body has a rotational axis. The plurality of teeth are disposed along a circumferential direction on a radially outer side of the sprocket main body. The plurality of teeth include at least one first tooth and at least one second tooth. The at least one projecting member protrudes from an axial surface of the at least one first tooth. The at least one projecting member is a different material from the teeth. The at least one projecting member and the at least one first tooth define a first chain engaging tooth width for engaging with an outer link of a bicycle chain. The at least one second tooth defines a second chain engaging tooth width for engaging with an inner link of the bicycle chain. The first chain engaging tooth width is greater than the second chain engaging tooth width.

In this bicycle sprocket, the chain is mounted to the sprocket so that the first tooth of greater axial width engages with an outer link, and the second tooth of less axial width than the first tooth engages with an inner link.

In accordance with a second aspect of the present invention, the bicycle sprocket according to the first aspect is configured so that the at least one first tooth includes a plurality of the first teeth with each of the first teeth including the at least one projecting member.

In accordance with a third aspect of the present invention, the bicycle sprocket according to the first aspect is configured so that the at least one second tooth includes a plurality of the second teeth.

In accordance with a fourth aspect of the present invention, the bicycle sprocket according to the first aspect is configured so that the at least one first tooth includes a plurality of the first teeth with each of the first teeth including the at least one projecting member, and the at least one second tooth includes a plurality of the second teeth.

In accordance with a fifth aspect of the present invention, the bicycle sprocket according to the fourth aspect is configured so that the first teeth and the second teeth are alternately disposed in a circumferential direction.

In accordance with a sixth aspect of the present invention, the bicycle sprocket according to the fifth aspect is configured so that a total number of the plurality of teeth is even.

In accordance with a seventh aspect of the present invention, the bicycle sprocket according to the fourth aspect is configured so that the at least one projecting member does not extend below a root tooth radius of the first teeth such that the at least one projecting member includes a plurality of separate individual sections.

In accordance with an eighth aspect of the present invention, the bicycle sprocket according to the fourth aspect is configured so that the at least one projecting member extends below a root tooth radius of the first teeth such that the at least one projecting member extends continuously between at least two of the first teeth and along a portion of the sprocket main body.

In accordance with a ninth aspect of the present invention, the bicycle sprocket according to the first aspect is configured so that the at least one projecting member is made of a resin material, and the plurality of teeth are made of a metallic material.

In accordance with a tenth aspect of the present invention, the bicycle sprocket according to the first aspect is configured so that the at least one first tooth has a first axial surface and a second axial surface that is opposite to the first axial surface, and the at least one projecting member includes a first projecting member that is attached to the first axial surface of the at least one first tooth, and a second projecting member that is attached to the second axial surface of the at least one first tooth.

In accordance with an eleventh aspect of the present invention, the bicycle sprocket according to the tenth aspect is configured an that the at least one first tooth includes a plurality of the first teeth with each of the first teeth including the first and second projecting members, and the at least one second tooth includes a plurality of the second teeth.

In accordance with a twelfth aspect of the present invention, the bicycle sprocket according to the eleventh aspect is configured so that the first teeth and the second teeth are alternately disposed in a circumferential direction.

In accordance with a thirteenth aspect of the present invention, the bicycle sprocket according to the twelfth aspect is configured so that a total number of the plurality of teeth is even.

In accordance with a fourteenth aspect of the present invention, the bicycle sprocket according to the eleventh aspect is configured so that the first and second projecting members do not extend below a root tooth radius of the first teeth such that each of the first and second projecting members includes a plurality of separate individual sections.

In accordance with a fifteenth aspect of the present invention, the bicycle sprocket according to the eleventh aspect is configured so that the first and second projecting members extend below a root tooth radius of the first teeth such that the first and second projecting members extend continuously between at least two of the first teeth and along a portion of the sprocket main body.

In accordance with a sixteenth aspect of the present invention, the bicycle sprocket according to the first aspect is configured so that the at least one projecting member is attached to the at least one first tooth by an integral molding process.

In accordance with a seventeenth aspect of the present invention, the bicycle sprocket according to the ten aspect is configured so that the first and second projecting members are attached to the at least one first tooth by an integral molding process.

In accordance with an eighteenth aspect of the present invention, a bicycle crank assembly is provided that basically comprises a crank arm with only a single sprocket attached to the crank arm, wherein the single sprocket is a bicycle sprocket according to any one of the first to seventeenth aspects of the present invention.

Also other objects, features, aspects and advantages of the disclosed bicycle sprocket will become apparent to those skilled in the art from the following detailed description, which, taken in conjunction with the annexed drawings, discloses selected embodiments of the bicycle sprocket.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
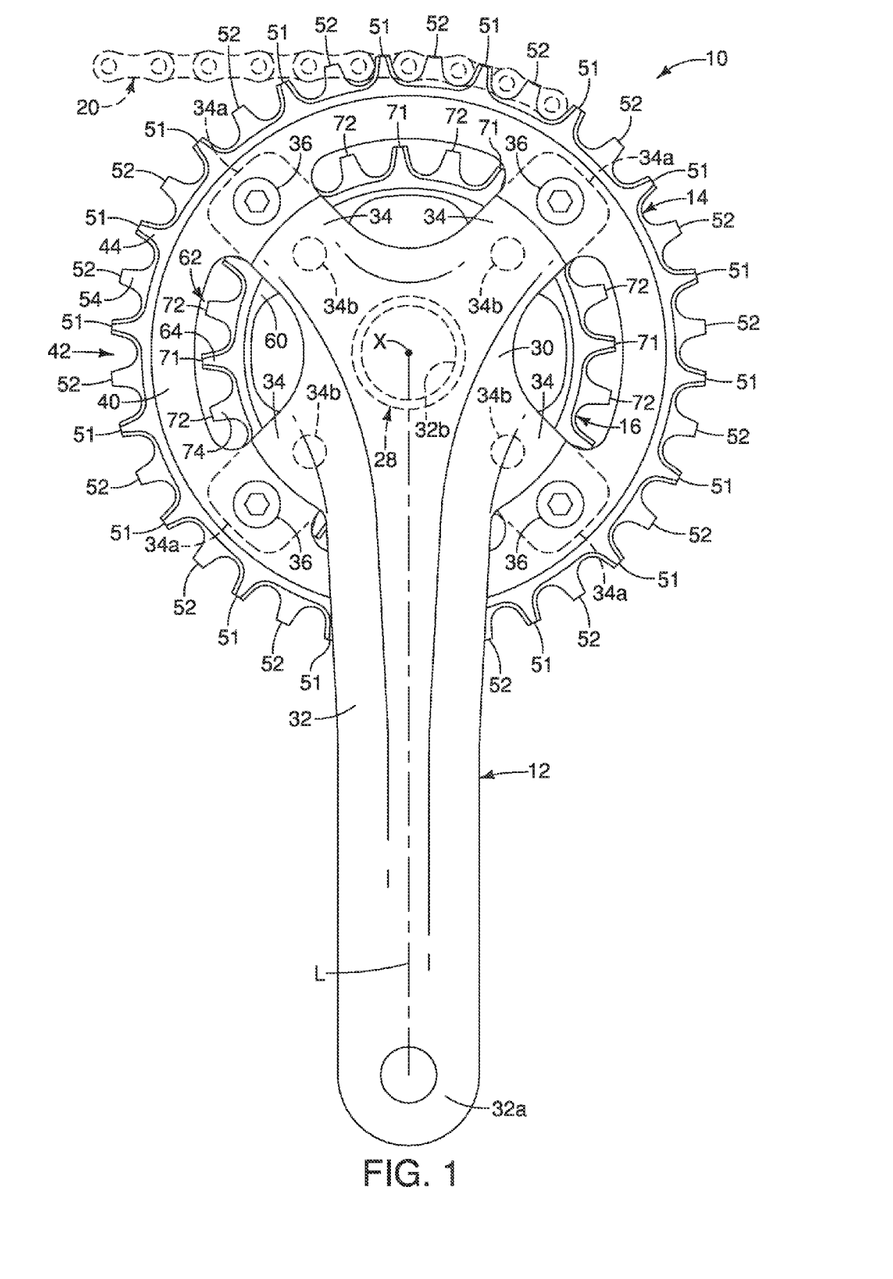
FIG. 1 is an outside elevational view of a bicycle crank assembly having first and second sprockets configured in accordance with a first embodiment.

Referring initially to FIG. 1, a bicycle crank assembly 10 according to a first embodiment is illustrated. In the first embodiment, the bicycle crank assembly 10 comprises a crank arm 12, a first sprocket 14 and a second sprocket 16. More broadly speaking, the bicycle crank assembly 10 basically comprises a crank arm and at least one sprocket. The first and second sprockets 14 and 16 are bicycle sprockets according to an embodiment. The second sprocket 16 has fewer teeth than the first sprocket 14. The first and second sprockets 14 and 16 are front sprockets that can engage with a bicycle chain 20.

Figure 2:
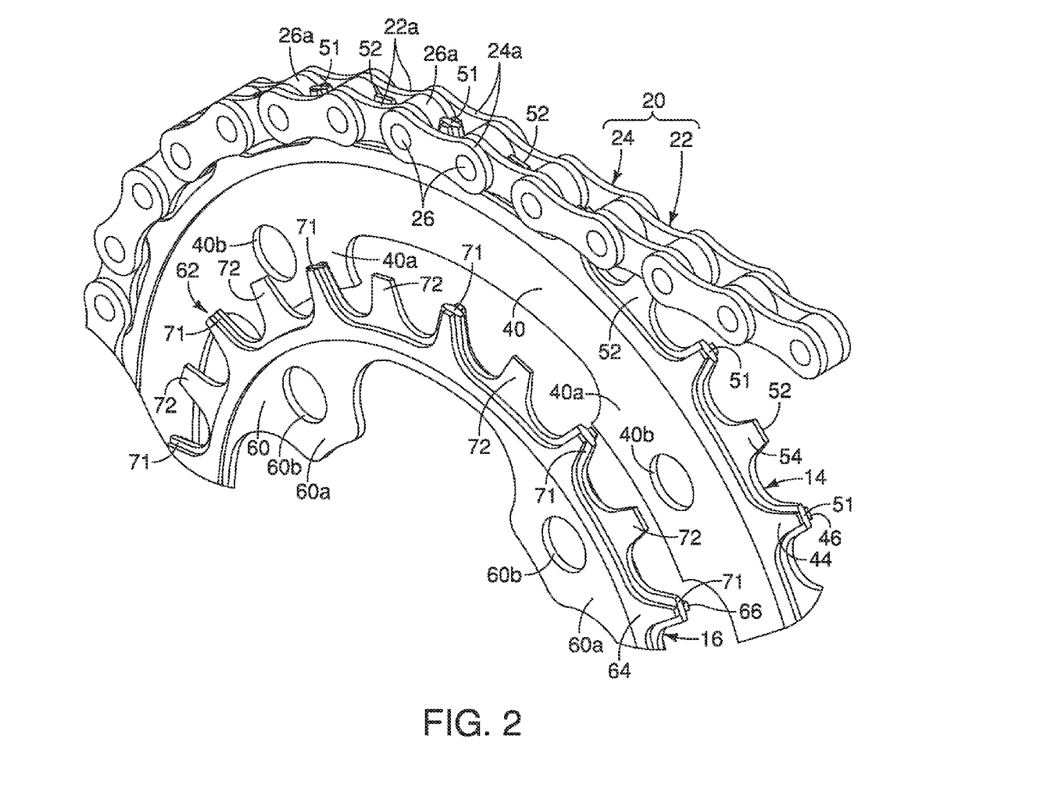
FIG. 2 is a partial inside perspective view of the first and second sprockets of the bicycle crank assembly illustrated in FIG. 1 with a bicycle chain engaged with the teeth of the first (larger) sprocket.

As seen in FIG. 2, the bicycle chain 20 has a plurality of inner links 22 and a plurality of outer links 24 that are interconnected in an alternating manner by a plurality of pins 26. Typically, each of the inner links 22 includes a pair of parallel inner link plates 22a. Each of the outer links 24 includes a pair of parallel outer link plates 24a. Preferably, each of the pins 26 has a roller 26a that is rotatably disposed thereon. Thus, the bicycle chain 20 is a conventional bicycle chain.

The crank arm 12 is integrally and non-rotatably fixed to one end a crankshaft 28. Typically, a second crank arm (not shown) is non-rotatably attached to the other end of the crankshaft 28. The crankshaft 28 defines a rotational center axis X of the first and second sprockets 14 and 16. The at least one sprocket (e.g. the first and second sprockets 14 and 16) has a rotational center axis X. The crank arm 12 has a sprocket attachment part 30 and an arm part 32 provided with a pedal attachment part 32a. The crank arm 12 has a longitudinal center line L that extends between the sprocket attachment part 30 and the pedal attachment part 32a. The at least one sprocket (e.g. the first and second sprockets 14 and 16) is attached to the sprocket attachment part 30 of the crank arm 12.

The sprocket attachment part 30 can be either integrally to or separate from the arm part 32. The sprocket attachment part 30 has a plurality (e.g. four) of sprocket attachment arms 34 disposed at intervals in the circumferential direction. The circumferential intervals of the sprocket attachment arms 34 may be equal intervals but may also be unequal intervals. In the first embodiment, the sprocket attachment arms 34 are disposed at equal intervals. Each of the sprocket attachment arms 34 has a first attachment part 34a for attaching the first sprocket 114. The first attachment parts 34a are formed at the distal ends of the sprocket attachment arms 34. Each of the sprocket attachment arms 34 has a second attachment part 34b for attaching the second sprocket 16. The second attachment parts 34b are formed farther inward in the radial direction than the first attachment parts 34a. The first attachment parts 34a and the second attachment parts 34b include through-holes or blind bores that are either threaded or not threaded. In the first embodiment, the first attachment parts 34a are configured with non-threaded through-holes, and the second attachment parts 34b are configured with blind screw holes. The first sprocket 14 is fixed to the first attachment parts 34a by first fixing bolts 36. The second sprocket 16 is fixed to the second attachment parts 34b by second fixing bolts (not shown).

The arm part 32 is formed either integrally with or separate from the sprocket attachment part 30. In the first embodiment, the arm part 32 is configured integrally with the sprocket attachment part 30. The pedal attachment part 32a defines a threaded hole in which a pedal (not shown) can be mounted in the distal end. The arm part 32 also includes a fixing hole 32b to which the crankshaft 28 is fixed.

Figure 3:
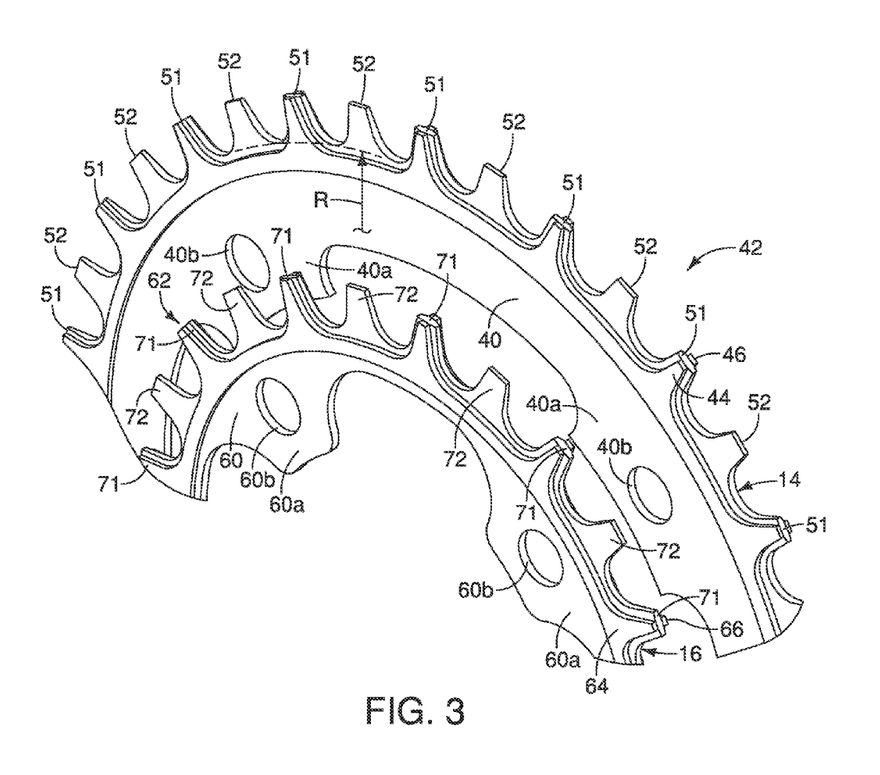
FIG. 3 is a partial inside perspective view, similar to FIG. 2, of the first and second sprockets of the bicycle crank assembly illustrated in FIG. 1, but without the bicycle chain.
Figure 4:
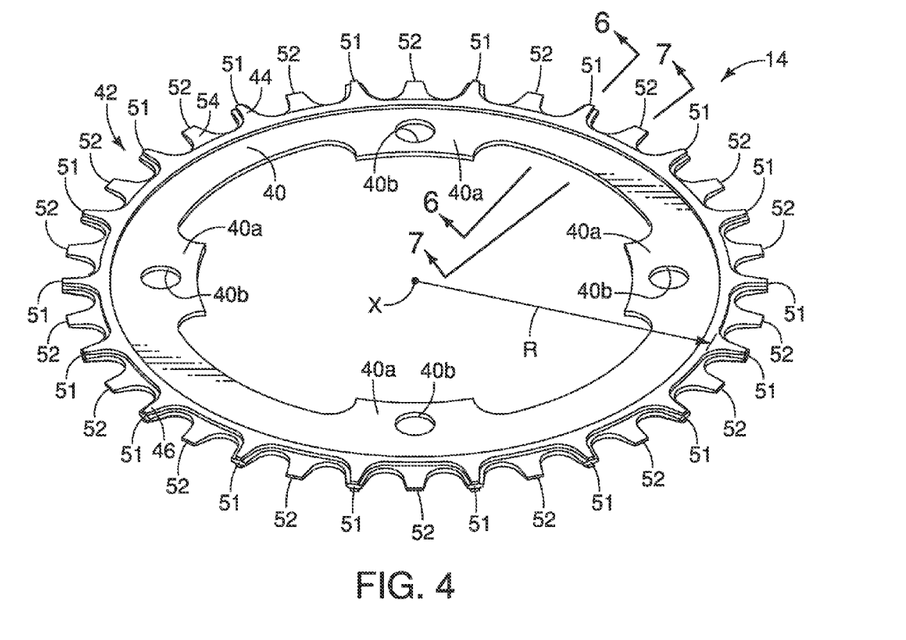
FIG. 4 is an outside perspective view of the first sprocket of the bicycle crank assembly illustrated in FIGS. 1 to 3.
Figure 5:
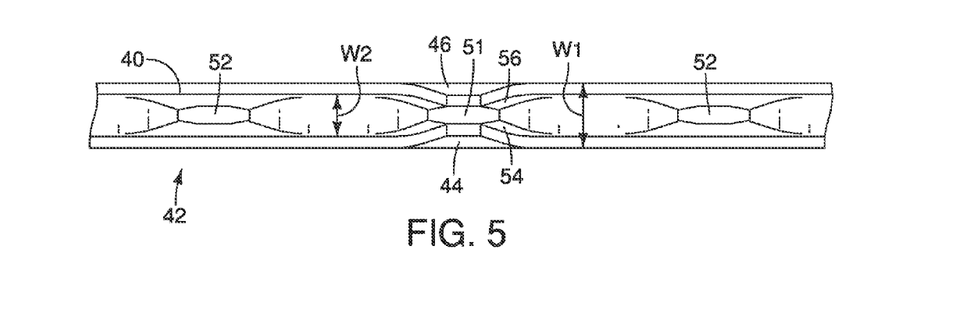
FIG. 5 is a partial edge view of the first sprocket illustrated in FIG. 4 showing one of the first teeth and two of the second teeth of the first sprocket.

As seen in FIGS. 3 to 5, the first sprocket 14 includes a first sprocket main body 40, a plurality of teeth 42 and at least one projecting member 44 or 46 disposed on alternating ones of the teeth 42. The first sprocket main body 40 has a plurality (e.g. four) of first fixed parts 40a for fixing to the first attachment parts 34a of the sprocket attachment arms 34. In the first embodiment, the first fixing parts 40a include through-holes 40b. The first sprocket 14 is fixed to the sprocket attachment arms 34 by the first fixing bolts 36 and a nut member (not shown) threaded with the first fixing bolts 36 in a conventional manner.

The at least one projecting member 44 or 46 is a different material from the teeth 42. Preferably, the at least one projecting member 44 or 46 is made of a resin material such as preferably a fiber-reinforced resin material. Preferably, the plurality of teeth 42 are made of a metallic material such as preferably aluminum, titanium, stainless steel, magnesium, beryllium or other suitable metallic materials. The first sprocket main body 40 and the teeth 42 can be both made of a metallic material, and can be formed integrally as a one-piece, unitary member. If weight saving is needed and/or desired, the first sprocket main body 40 can include a non-metallic material such as preferably a fiber-reinforced resin material while the teeth 42 can include a metallic material. When the projecting members 44 and 46 are made of resin material, as illustrated, the projecting members 44 and 46 can be attached to the first sprocket main body 40 and the teeth 42 by the integral molding process or adhesive. In particular, the integral molding process can be performed such that the resin of the projecting members 44 and 46 can extend into dimples preferably formed on the first sprocket main body 40 and the teeth 42 during formation of the projecting members 44 and 46.

The first sprocket main body 40 has a rotational axis that corresponds to the rotational center axis X of the first sprocket 14. The plurality of teeth 42 are disposed along a circumferential direction on a radially outer side of the sprocket main body 40. Here, in the first embodiment, for example, the first sprocket 14 has thirty-six of the plurality of teeth 42. Thus, a total number of the plurality of teeth 42 is even for the first sprocket 14. The plurality of teeth 42 includes at least one first tooth 51 and at least one second tooth 52. The at least one first tooth 51 has a first axial surface 54 and a second axial surface 56 that is opposite to the first axial surface 54. The at least one projecting member 44 or 46 axially protrudes from one of the axial surfaces 54 or 56 of the at least one first tooth 51. The at least one projecting member 44 or 46 is attached to an axial surface 54 or 56 of the at least one first tooth 51 such that the at least one projecting member 44 or 46 overlaps the at least one first tooth 51 in an axial direction as viewed parallel to the rotational axis of the first sprocket main body 40. Here in the first embodiment, the at least one projecting member 44 or 46 is attached to the at least one first tooth 51 by an integral molding process or adhesive. Preferably, the at least one projecting member 44 or 46 includes a first projecting member 44 that is attached to the first axial surface 54 of the at least one first tooth 51, and a second projecting member 46 that is attached to the second axial surface 56 of the at least one first tooth 51. Preferably, the first and second axial surfaces 54 and 56 include a textured surface having dimples or the like such that the resin of the projecting members 44 and 46 can extend into dimples of the first sprocket main body 40 and the teeth 42 during formation of the projecting members 44 and 46. Preferably, as in the first embodiment, the first and second projecting members 44 and 46 are attached to the at least one first tooth 51 by an integral molding process.

As seen in FIG. 5, the at least one projecting member 44 or 46 and the at least one first tooth 51 define a first chain engaging tooth width W1 for engaging with the outer link 24 of the bicycle chain 20. The at least one second tooth 52 defines a second chain engaging tooth width W2 for engaging with the inner link 22 of the bicycle chain 20. The first chain engaging tooth width W1 is greater than the second chain engaging tooth width W2. The first chain engaging tooth widths W1 of the first teeth 51 are preferably in a range from 2.5 mm to 5.4 mm, and more preferably in a range from 3.0 mm to 4.5 mm. When the first chain engaging widths W1 of the first teeth 51 are in such a range, the first teeth 51 can readily engage the outer link plates 24a without engaging with the inner link plates 22a. The second chain engaging tooth widths W2 of the second teeth 52 are preferably in a range from 1.5 mm to 2.3 mm. When the second chain engaging widths W2 of the second teeth 52 are in such a range, the second teeth 52 have the necessary rigidity and readily engage with the inner link plates 22a. The first teeth 51 are preferably formed into a "+" (plus) shape as seen from the radially outer side, as shown in FIG. 5. The second teeth 52 are preferably formed into a "−" (minus) shape as seen from the radially outer side. The first teeth 51 and the second teeth 52 taper so as to gradually decrease in axial width toward the radially outer side. The first teeth 51 and the second teeth 52 thereby engage more readily with the outer link plate 24a and the inner link plates 22a. In the first embodiment, the first teeth 51 are identical to the second teeth 52 in terms of height in the radial direction.

Preferably, the at least one first tooth 51 includes a plurality of the first teeth 51 with each of the first teeth 51 including the at least one projecting member 44 or 46. Preferably, the at least one second tooth 52 includes a plurality of the second teeth 52, which are free of the projecting members 44 and 46. The first teeth 51 and the second teeth 52 are alternately disposed in a circumferential direction. While the first and second teeth 51 and 52 are illustrated as straight symmetrical teeth, it will be apparent from this disclosure that the first and second teeth 51 and 52 can be asymmetrical teeth, twisted teeth, shifting teeth with shifting features, and/or the like.

Figure 6:
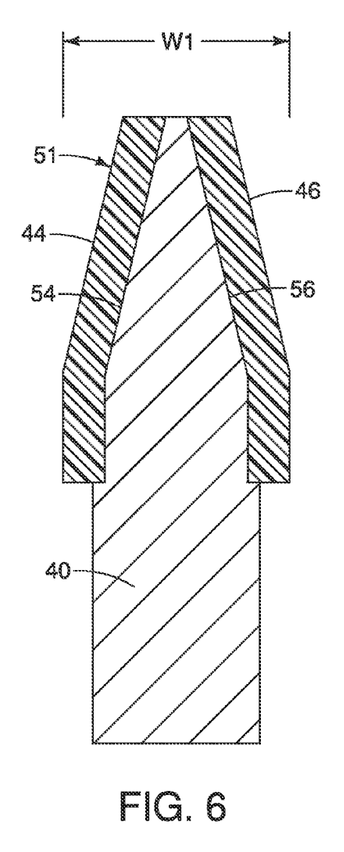
FIG. 6 is a cross sectional view of the first sprocket as seen along section line 6-6 of FIG. 4.
Figure 7:
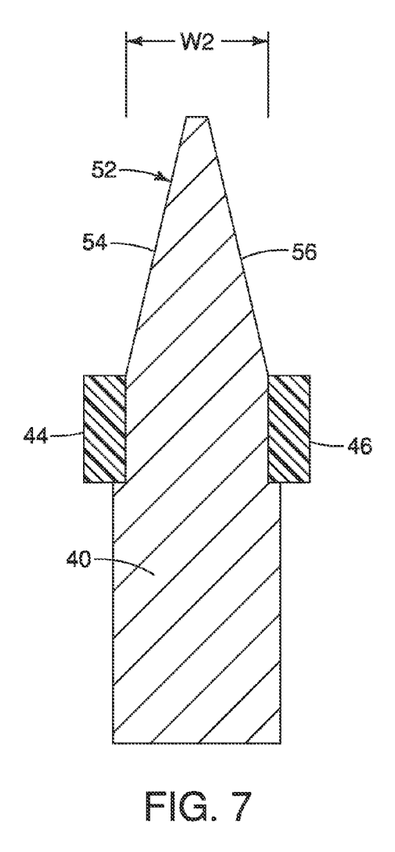
FIG. 7 is a cross sectional view of the first sprocket as seen along section line 7-7 of FIG. 4.

The at least one projecting member 44 or 46 extends below a root tooth radius R of the first teeth 51 such that the at least one projecting member 44 or 46 extends continuously between at least two of the first teeth 51 and along a portion of the sprocket main body 40. Preferably, each of the first teeth 51 includes both of the first and second projecting members 44 and 46. Also preferably, in this first embodiment, the first and second projecting members 44 and 46 extend below a root tooth radius R of the first teeth 51 such that the first and second projecting members 44 and 46 extend continuously between at least two of the first teeth 51 and along a portion of the sprocket main body 40.

Now, the second sprocket 16 will be discussed with reference to FIGS. 1 to 3, 8 and 9. Basically, the second sprocket 16 has the same configuration as the first sprocket 14, except that the second sprocket 16 is smaller than the first sprocket 14 and has fewer teeth than the first sprocket 14. In view of the similarity of the first and second sprockets 14 and 16, the second sprocket 16 will only be briefly discussed herein.

Figure 8:
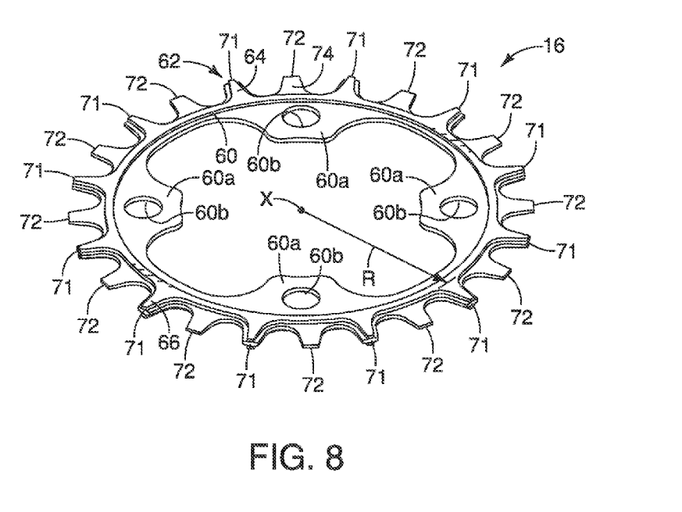
FIG. 8 is an outside perspective view of the second sprocket of the bicycle crank assembly illustrated in FIGS. 1 to 3.
Figure 9:
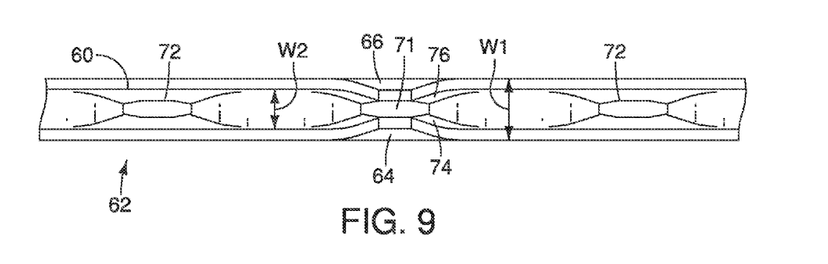
FIG. 9 is a partial edge view of the second sprocket illustrated in FIG. 8 showing one of the first teeth and two of the second teeth of the second sprocket.

The second sprocket 16 includes a second sprocket main body 60, a plurality of teeth 62, and first and second projecting members 64 and 66 on alternating ones of the teeth 62. The first and second projecting members 64 and 66 are a different material from the teeth 62. Preferably, the first and second projecting members 64 and 66 are made of a resin material such as preferably a fiber-reinforced resin material. Preferably, the teeth 62 are made of a metallic material such as preferably aluminum, titanium, stainless steel, magnesium, beryllium or other suitable metallic materials. The second sprocket main body 60 and the teeth 62 can be both made of a metallic material, and can be formed integrally as a one-piece, unitary member. If weight saving is needed and/or desired, the second sprocket main body 60 can include a non-metallic material such as preferably a fiber-reinforced resin material white the teeth 62 can include a metallic material.

The second sprocket main body 60 has a plurality (e.g. four) of second fixed parts 60a for fixing to the second attachment parts 34b (see FIG. 1) of the sprocket attachment arms 34. The second fixed parts 60a are configured from through-holes. The second sprocket 16 is fixed to the sprocket attachment arms 34 by the second fixing bolts (not shown) that are threaded into blind bores of the second attachment parts 34b.

Here in the first embodiment, for example, the second sprocket 16 has twenty-four of the plurality of teeth 62. Thus, a total number of the plurality of teeth 62 is even for the second sprocket 16. The teeth 62 include first and second teeth 71 and 72. The first and second projecting members 64 and 66 protrude from opposite axial surfaces 74 and 76 of the first teeth 71. The first and second teeth 71 and 72 of the second sprocket 16 have the same configurations and the same axial widths as the first and second teeth 51 and 52 of the first sprocket 14, respectively, as discussed above. The second sprocket main body 60 has a plurality (e.g. four) of second fixed parts 60a for fixing to the second attachment parts 34b of the sprocket attachment arms 34. In the first embodiment, the second fixing parts 60a include through-holes 60b. In the first embodiment, the first and second projecting members 64 and 66 are attached to the first teeth 71 by an integral molding process or adhesive.

Referring now to FIGS. 10 to 14, a bicycle crank assembly 110 according to a second embodiment is illustrated, in the second embodiment, the bicycle crank assembly 110 comprises a crank arm 112, a first sprocket 114 and second sprocket 116. Here, the crank arm 112 is identical to the crank arm 12 as discussed above. Regarding the first and second sprockets 114 and 116, only descriptions of the differences of the first and second sprockets 114 and 116 from the first and second sprockets 14 and 16 will be provided.

Figure 10:
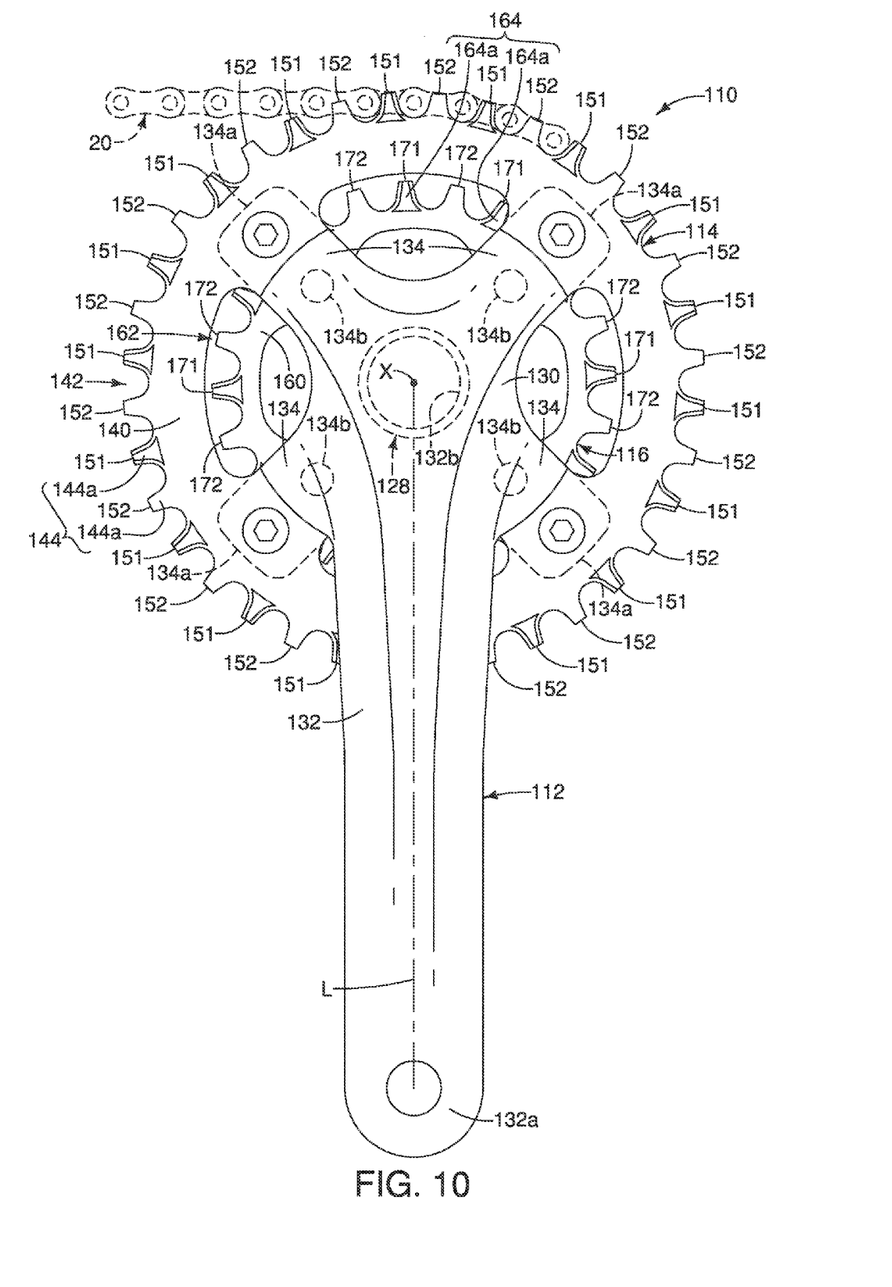
FIG. 10 is an outside elevational view of a bicycle crank assembly having first and second sprockets configured in accordance with a second embodiment.

As seen in FIG. 10, the crank arm 112 is integrally and non-rotatably fixed to one end a crankshaft 128. The crank arm 112 has a sprocket attachment part 130 and an arm part 132 provided with a pedal attachment part 132a. The crank arm 112 has a longitudinal center line L that extends between the sprocket attachment part 130 and the pedal attachment part 132a. The first and second sprockets 114 and 116 are fixedly attached to the sprocket attachment part 130 of the crank arm 112 by four sprocket attachment arms 134. Each of the sprocket attachment arms 134 has a first attachment part 134a for attaching the first sprocket 114 and a second attachment part 134b for attaching the second sprocket 116 in the same manner as the first embodiment.

Figure 11:
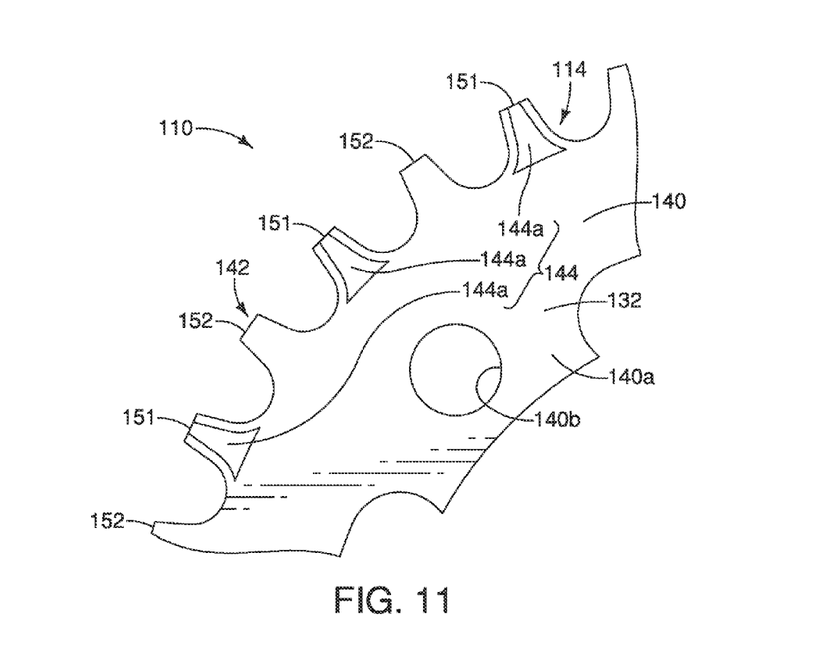
FIG. 11 is an outside elevational view of a portion of the first sprocket illustrated in FIG. 10.
Figure 12:
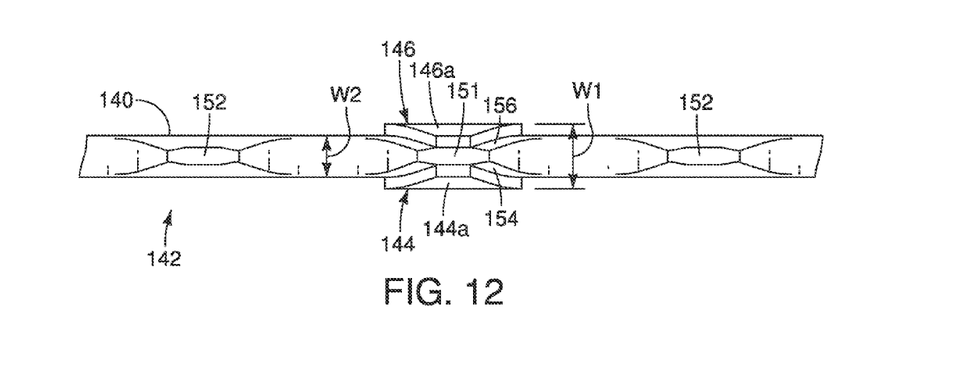
FIG. 12 is a partial edge view of the first sprocket illustrated in FIGS. 10 and 11 showing one of the first teeth and two of the second teeth of the first sprocket.

As seen in FIGS. 10, 11 and 12, the first sprocket 114 includes a first sprocket main body 140, a plurality of teeth 142, and at least one projecting member 144 or 146 disposed on alternating ones of the teeth 142. Preferably, the teeth 142 include a plurality of the first teeth 151 and a plurality of the second teeth 152. Each of the first teeth 151 includes one or both of the projecting members 144 and 146. Preferably, the second teeth 152 are free of the projecting members 144 and 146. The first and second projecting members 144 and 146 are a different material from the teeth 142 as in the first embodiment. Preferably, the first and second projecting members 144 and 146 are made of a resin material such as preferably a fiber-reinforced resin material. Preferably, the teeth 142 are made of a metallic material such as preferably aluminum, titanium, stainless steel, magnesium, beryllium or other suitable metallic materials. The first sprocket main body 140 and the teeth 142 can be both made of a metallic material, and can be formed integrally as a one-piece, unitary member. If weight saving is needed and/or desired, the first sprocket main body 140 can include a non-metallic material such as preferably a fiber-reinforced resin material while the teeth 142 can include a metallic material.

The first sprocket main body 140 and the teeth 142 are identical to the first sprocket main body 40 and the teeth 42 of the first embodiment. However, the first and second projecting members 144 and 146 are different from the first and second projecting members 44 and 46 of the first embodiment. Here in the second embodiment, the at least one projecting member 144 or 146 does not extend below a root tooth radius R of the first teeth 151 such that the at least one projecting member 144 or 146 includes a plurality of separate individual sections 144a or 146a. Preferably, each of the first teeth 151 includes both of the projecting members 144 and 146, which do not extend below the root tooth radius R of the first teeth 151 such that each of the first and second projecting members 144 and 146 includes a plurality of separate individual sections 144a and 146a. Here in the second embodiment, the projecting members 144 and 146 are attached to the first teeth 151 by an integral molding process or adhesive, similar to the first embodiment.

Figure 13:
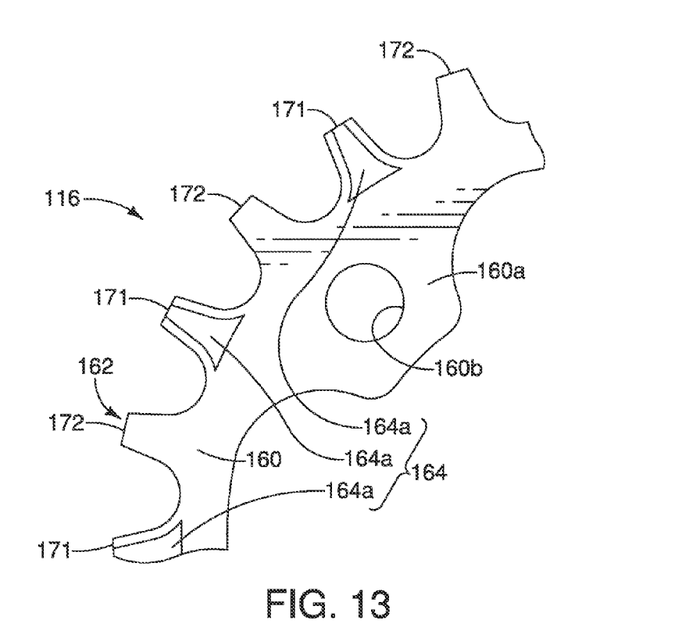
FIG. 13 is an outside elevational view of a portion of the second sprocket illustrated in FIG. 10.
Figure 14:
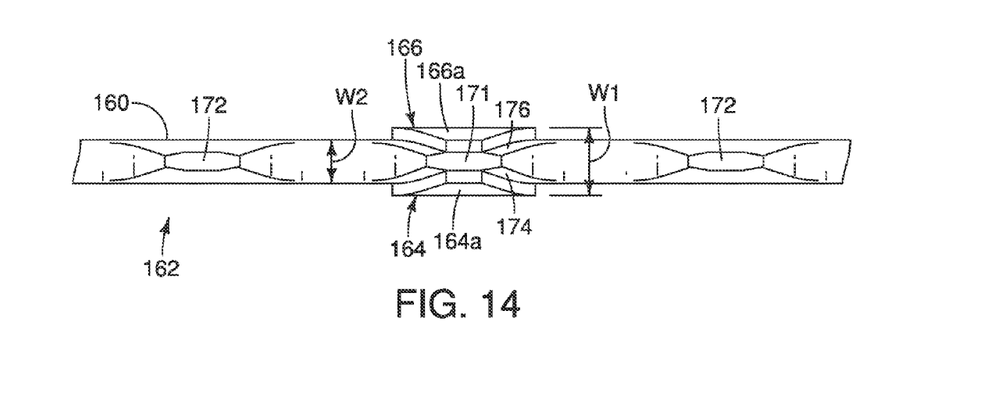
FIG. 14 is a partial edge view of the second sprocket illustrated in FIGS. 10 and 13 showing one of the first teeth and two of the second teeth of the second sprocket.

As seen in FIGS. 10, 13 and 14, the second sprocket 116 includes a second sprocket main body 160, a plurality of teeth 162 and first and second projecting members 164 and 166 on alternating ones of the teeth 162. Preferably, the teeth 162 include a plurality of the first teeth 171 and a plurality of the second teeth 172. Each of the first teeth 171 includes one or both of the projecting members 164 and 166. Preferably, the second teeth 172 are free of the projecting members 164 and 166.

The first and second projecting members 164 and 166 are a different material from the teeth 162 as in the first embodiment. Preferably, the first and second projecting members 164 and 166 are made of a resin material such as preferably a fiber-reinforced resin material. In the second embodiment, the first and second projecting members 164 and 166 are attached to the first teeth 171 by an integral molding process or adhesive. Preferably, the teeth 162 are made of a metallic material such as preferably aluminum, titanium, stainless steel, magnesium, beryllium or other suitable metallic materials. The second sprocket main body 160 and the teeth 162 can be both made of a metallic material, and can be formed integrally as a one-piece, unitary member. If weight saving is needed and/or desired, the second sprocket main body 160 can include a non-metallic material such as preferably a fiber-reinforced resin material while the teeth 162 can include a metallic material.

The second sprocket main body 160 and the teeth 162 are identical to the second sprocket main body 60 and the teeth 62 of the first embodiment. However, the first and second projecting members 164 and 166 are different from the first and second projecting members 64 and 66 of the first embodiment. Here in the second embodiment, the projecting member 164 or 166 do not extend below a root tooth radius R of the second teeth 171 such that the at least one projecting member 164 or 166 includes a plurality of separate individual sections 164a or 166a. Preferably, each of the first teeth 171 includes both of the projecting members 164 and 166, which do not extend below the root tooth radius R of the first teeth 171 such that each of the first and second projecting members 164 and 146 includes a plurality of separate individual sections 164a and 166a. Here in the second embodiment, the projecting members 164 and 166 are attached to the first teeth 171 by an integral molding process or adhesive, similar to the first embodiment.

Figure 15:
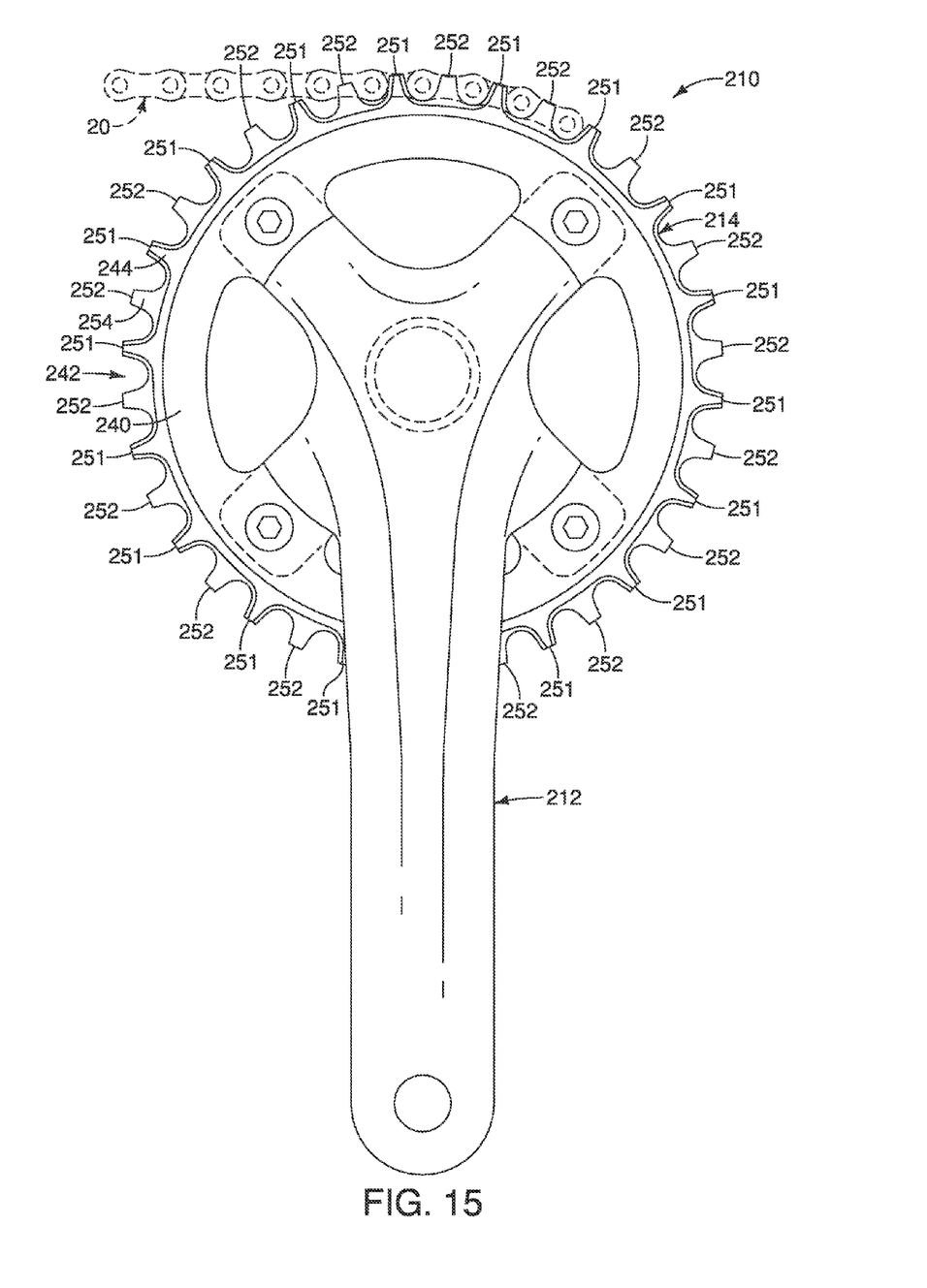
FIG. 15 is an outside elevational view of a bicycle crank assembly having a crank arm with only a single sprocket attach to the crank arm in accordance with a third embodiment.

Referring now to FIG. 15, a bicycle crank assembly 210 according to a third embodiment is illustrated. Here, the bicycle crank assembly 210 has a crank arm 212 with only a single sprocket 214 attached to the crank arm 212. With the bicycle crank assembly 210, the bicycle chain 20 does not easily disengage from the sprocket 214 when, for example, riding on a rough terrain.

Here, the crank arm 212 is identical to the crank arm 12, as discussed above, except that the second attachment part has been eliminated from the crank arm 212 such that only the sprocket 214 can be attach to the crank arm 212. The sprocket 214 is identical to either the first sprocket 14 or the first sprocket 114. In FIG. 15, the sprocket 214 is illustrated as being identical to the first sprocket 14. Thus, the sprocket 214 includes a sprocket main body 240 and a plurality of teeth 242. In view of the similarity of the crank arm 212 and the sprocket 214 to the corresponding parts of the prior embodiments, as discussed above, the crank arm 212 and the sprocket 214 will not be discussed and/or illustrated in further detail.

Projecting members of the sprocket 214 can be attached to the sprocket main body 240 and the teeth 242 as shown or just to the teeth 242. The projecting members (only one shown) are formed of a different material from the teeth 242. In FIG. 15, alternating ones of the teeth 242 include the projecting members (only the projecting member 244 is shown since only one axial side of the sprocket 214 is illustrated). For example, the teeth 242 include a plurality of first teeth 251 and a plurality of second teeth 252 in which opposite axial surfaces of the first teeth 251 include the projecting members In other words, preferably, the other axial side of the sprocket 214 also preferably includes a projecting member in the same manner as shown in FIGS. 2 to 7. Alternatively, the projecting members of the sprocket 214 can be configured as seen in FIGS. 11 and 12.

As in the prior embodiments, the projecting members of the sprocket 214 are made of a resin material such as preferably a fiber-reinforced resin material. Preferably, the teeth 242 are made of a metallic material such as preferably aluminum, titanium, stainless steel, magnesium, beryllium or other suitable metallic materials. The sprocket main body 240 and the teeth 242 can be both made of a metallic material, and can be formed integrally as a one-piece, unitary member. If weight saving is needed and/or desired, the sprocket main body 240 can include a non-metallic material such as preferably a fiber-reinforced resin material while the teeth 242 can include a metallic material. When the projecting members of the sprocket 214 are made of resin material, as illustrated, the projecting members of the sprocket 214 can be attached to the sprocket main body 240 and the teeth 242 by the integral molding process or adhesive. In particular, the integral molding process can be performed such that the resin of the projecting members of the sprocket 214 can extend into dimples preferably formed on the sprocket main body 240 and the teeth 242 during formation of the projecting members of the sprocket 214.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as the changes do not substantially affect their intended function.

Also in the bicycle crank assembly of the first and second embodiments, the first and second teeth having different axial widths are provided to both of the sprockets, but the present invention is not limited as such. Furthermore, while each of the bicycle crank assemblies 10 and 110 has only two sprockets, it will be apparent from this disclosure that the bicycle crank assemblies 10 and 110 can include a third sprocket.

In the first to third embodiments, the first teeth were formed into + shapes as seen from the radially outer side, but the present invention is not limited as such. These teeth may also be formed into other shapes such as diamonds, trapezoids, triangles, and hexagons.

In the first to third embodiments, there are four sprocket attachment arms, but the number of sprocket attachment arms is not limited to four.

In the first to third embodiments, the sprocket main bodies and the pluralities of teeth are formed integrally, but the present invention is not limited as such. The sprocket main bodies and the pluralities of teeth may be formed separately. The pluralities of teeth may be made of metal, for example, and the sprocket main bodies may be made of a synthetic resin such as a carbon fiber reinforced resin or a different metal than the teeth, for example (a light metal such as aluminum, for example), to reduce weight.

According to the present invention, the projecting members can be made of an elastomeric material. Preferably, the projecting members can be made of an elastomeric material having high abrasion resistance.

As used herein, the following directional terms "left" and "right" are used to indicate the "right" when referencing from the right side as viewed from the rear of the bicycle, and the "left" when referencing from the left side as viewed from the rear of the bicycle. Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

Thus, the foregoing descriptions of the embodiments according to the present invention are provided for illustration only, and not for the purpose of limiting the invention as defined by the appended claims and their equivalents.

What is claimed is:

1. A bicycle sprocket comprising:
   a sprocket main body having a rotational axis;
   a plurality of teeth disposed along a circumferential direction on a radially outer side of the sprocket main body, the plurality of teeth including at least one first tooth and at least one second tooth; and
   at least one projecting member attached to an axial surface of the at least one first tooth such that the at least one projecting member overlaps the at least one first tooth in an axial direction as viewed parallel to the rotational axis, the at least one projecting member being a different material from the plurality of teeth,
   the at least one projecting member and the at least one first tooth defining a first chain engaging tooth width for engaging with an outer link of a chain and the at least one second tooth defining a second chain engaging tooth width for engaging with an inner link of the chain, the first chain engaging tooth width being greater than the second chain engaging tooth width, the at least one second tooth being free of the at least one projecting member.

2. The bicycle sprocket according to claim 1, wherein the at least one first tooth includes a plurality of the first teeth with each of the first teeth including the at least one projecting member.

3. The bicycle sprocket according to claim 1, wherein the at least one second tooth includes a plurality of the second teeth.

4. The bicycle sprocket according to claim 1, wherein the at least one first tooth includes a plurality of the first teeth with each of the first teeth including the at least one projecting member, and
   the at least one second tooth includes a plurality of the second teeth.

5. The bicycle sprocket according to claim 4, wherein the first teeth and the second teeth are alternately disposed in a circumferential direction.

6. The bicycle sprocket according to claim 5, wherein a total number of the plurality of teeth is even.

7. The bicycle sprocket according to claim 4, wherein the at least one projecting member does not extend below a root tooth radius of the first teeth such that the at least one projecting member includes a plurality of separate individual sections.

8. The bicycle sprocket according to claim 4, wherein the at least one projecting member extends below a root tooth radius of the first teeth such that the at least one projecting member extends continuously between at least two of the first teeth and along a portion of the sprocket main body.

9. The bicycle sprocket according to claim 1, wherein the at least one projecting member is made of a resin material, and the plurality of teeth are made of a metallic material.

10. The bicycle sprocket according to claim 1, wherein the at least one first tooth has a first axial surface and a second axial surface that is opposite to the first axial surface, and
    the at least one projecting member includes a first projecting member that is attached to the first axial surface of the at least one first tooth, and a second projecting member that is attached to the second axial surface of the at least one first tooth.

11. The bicycle sprocket according to claim 10, wherein the at least one first tooth includes a plurality of the first teeth with each of the first teeth including the first and second projecting members, and
    the at least one second tooth includes a plurality of the second teeth.

12. The bicycle sprocket according to claim 11, wherein the first teeth and the second teeth are alternately disposed in a circumferential direction.

13. The bicycle sprocket according to claim 12, wherein a total number of the plurality of teeth is even.

14. The bicycle sprocket according to claim 11, wherein the first and second projecting members do not extend below a root tooth radius of the first teeth such that each of the first and second projecting members includes a plurality of separate individual sections.

15. The bicycle sprocket according to claim 11, wherein the first and second projecting members extend below a root tooth radius of the first teeth such that the first and second projecting members extend continuously between at least two of the first teeth and along a portion of the sprocket main body.

16. The bicycle sprocket according to claim 1, wherein the at least one projecting member is attached to the at least one first tooth by an integral molding process.

17. The bicycle sprocket according to claim 10, wherein the first and second projecting members are attached to the at least one first tooth by an integral molding process.

18. A bicycle crank assembly including the bicycle sprocket according to claim 1, the bicycle crank assembly further comprising:
    a crank arm including only the single sprocket attached to the crank arm.

* * * * *